June 25, 1968 — R. E. McMINN — 3,389,537
PIPELINE SCRUBBER
Filed Oct. 28, 1966
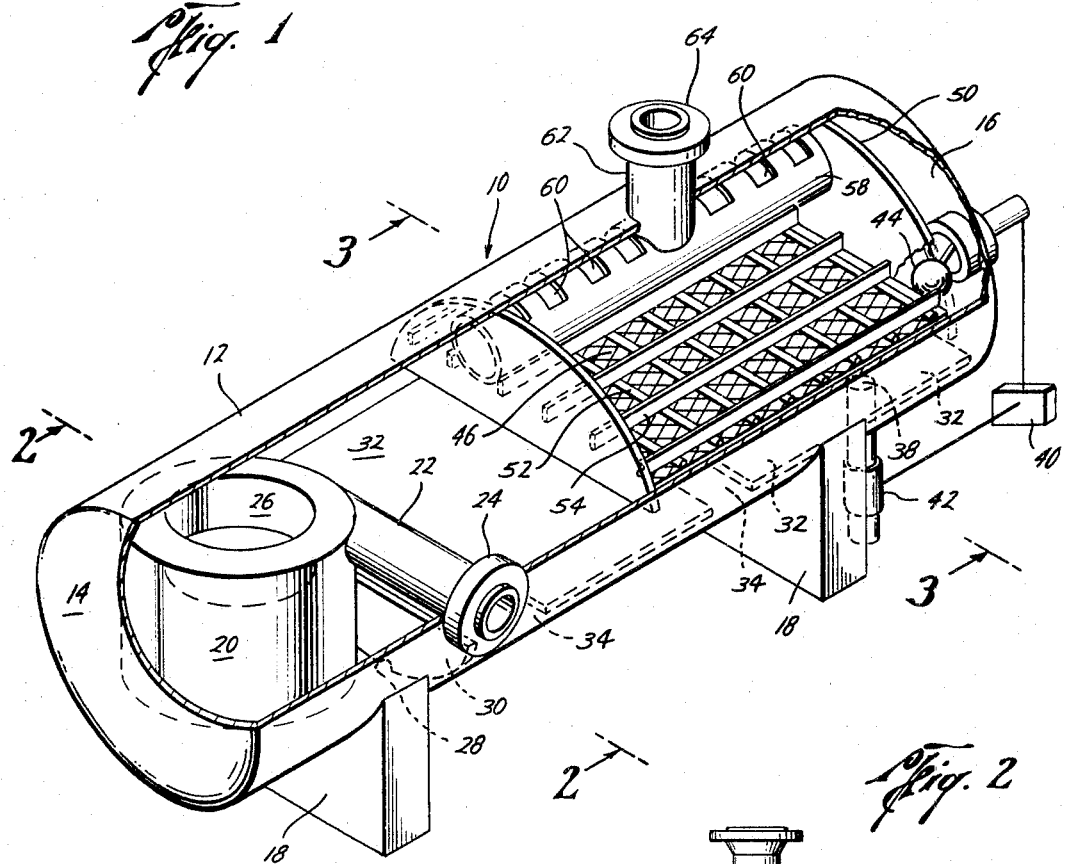
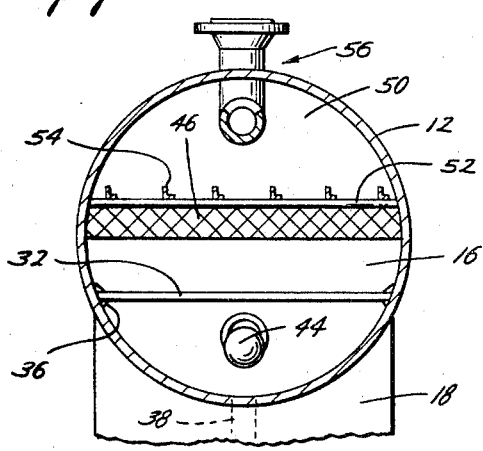
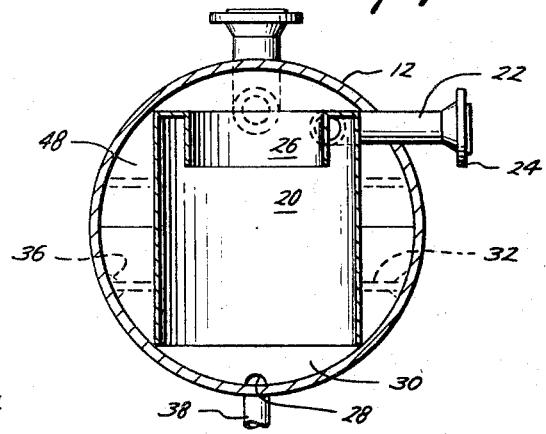
Robert E. McMinn
INVENTOR.
BY  James F. Weiler
William A. Stout
Dudley R. Dobie, Jr.
Henry W. Hope
ATTORNEYS 3,389,537
PIPELINE SCRUBBER
Robert E. McMinn, Oklahoma City, Okla., assignor to Black, Sivalls & Bryson, Inc., Kansas City, Mo., a corporation of Delaware
Filed Oct. 28, 1966, Ser. No. 590,271
4 Claims. (Cl. 55—337)

ABSTRACT OF THE DISCLOSURE

Apparatus for separation of liquid from gas comprising a vessel containing a slug knockout means, a slug dam, anti-reentrainment baffles disposed above a maintained liquid level and a mist extractor enclosing the gas outlet in the vessel.

---

The present invention relates to apparatus for the separation of liquid from gas, and more particularly to apparatus for the separation of liquid from a gas stream which contains liquid in both mist and slug form.

The present invention incorporates in a vessel a slug knockout means, such as a cyclone, and a slug dam having a bleed hole at the bottom thereof for the flow of the separated fluid. Anti-re-entrainment baffles are disposed above the maintained liquid level and a mist extractor encloses the gas outlet in the vessel, both of which are located above the baffles.

Before gas can be used by the consumer, any liquid contained therein must be removed. Conventionally, numerous methods and apparatus have been devised to remove fine particles of liquid which have become entrained in a gas stream. Moreover, wellhead separation processes remove all but a very small amount of larger agglomerations liquid from a gas stream. Liquid remaining entrained in the gas usually can be handled by conventional mist extracting apparatus. Under certain conditions, however, this liquid in mist form will collect into bodies of substantial size, known in the art as "slugs," and be re-entrained in the gas stream. These larger bodies or slugs of liquid, if allowed to reach the mist extracting apparatus, would immediately overload this apparatus, rendering it ineffective. As a consequence, liquid would be carried out of the separating apparatus. The problem sought to be overcome by the present invention, therefore is not only the removal of the fine particle or mist form of the liquid, but also larger bodies of liquid which occasionally form in a stream of gas moving through a pipeline.

The present invention seeks to provide apparatus by which proper separation of liquid from a moving stream can be obtained, even where the liquid is present in substantial quantities, and whereby re-entrainment of this liquid, once separate, is prevented. The present invention seeks to accomplish such separation by utilizing in a scrubber or treatment vessel, a slug knockout means to remove the slug of liquid as it enters the vessel. In the presently preferred embodiment of the invention, the knockout means is comprised of a cyclone located inside the vessel and connected to the inlet-feeding means of the gas stream. The centrifugal force exerted on the gas stream in the cyclone is effective to remove slugs of liquid from the stream, the slugs passing out of the bottom of the cyclone while the gas stream flows upwardly and through the top of the cyclone. The gas flows from the cyclone to mist extracting apparatus where the fine particles of the liquid are removed, the gas then passing out of the vessel.

Located on the downstream side of the bottom of the cyclone is a "slug dam." For purposes of this application, when reference is made to the downstream or upstream side it is in reference to the flow of the gas stream rather than the liquid. The slug dam prevents a sudden surge through the vessel of liquid that has been separated by the cyclone. When an especially large slug of liquid passes into the scrubber vessel, the discharge of this large quantity from the cyclone could overflow the mist extractor and render it useless. The slug dam prohibits such free movement of any liquid that issue from the cyclone. A bleed hole or a restricted orifice is located in the bottom of the dam and allows a regulated flow of the liquid through the dam for the removal thereof.

The present invention further utilizes horizontally disposed anti-re-entrainment baffles located on the downstream side of the dam and extending almost to the end of the scrubber vessel. These baffles prevent re-entrainment by the gas stream of previously separated liquid as the stream moves from the cyclone to the mist extractor. Liquid level control means are utilized in conjunction with a liquid outlet to provide for the removal of the liquid when a predetermined amount has been separated.

It is, therefore, an object of the present invention to provide apparatus for scrubbing a gas stream to remove small as well as substantial quantities of liquid therefrom.

Another object of the present invention is to provide simple and inexpensive apparatus to remove both fine liquid particles and large slugs of liquid from a gas stream with little danger of overloading the mist extracting apparatus.

A still further object is to remove large slugs of liquid from a gas stream and to prevent re-entrainment of the separated liquid in the gas stream.

An additional object is to utilize a slug dam in the separator apparatus to prevent the overflow of the mist extracting apparatus when a large slug of liquid is carried into the separator by the gas stream, the dam having a bleed hole to allow the liquid to flow at a controlled rate to an outlet port.

Other and further objects, features and advantages will be apparent from the following description of a presently preferred embodiment of the invention given for the purpose of disclosure, and taken in conjunction with the accompanying drawings, wherein like character references designate like parts throughout the several views and where:

FIGURE 1 is a perspective view of the preferred embodiment of the present invention, a portion thereof being broken away for purposes of illustration, FIGURE 2 is an end section view of the vessel taken along section lines 2—2 of FIGURE 1, and FIGURE 3 is an end section view taken along section lines 3—3 of FIGURE 1.

To properly understand the present invention, it is perhaps best to appreciate the major problem which the present invention seeks to overcome. In transmitting gas from one location to another, the pipelines are laid in such a manner as to follow the contour of the land. Accordingly, the pipeline will rise and fall as the land rises and falls.

Although the gas has previously been passed through a conventional liquid-gas separator, a certain amount of liquid remains entrained in the gas. This amount may, for example, be as small as 1/10 of a gallon per 1,000,000 cubic feet of gas. As the gas passes through the pipeline, it may cool to a certain extent which will cause the condensation and coalescence of liquid entrained therein. This liquid will drop out of the gas stream onto the bottom of the pipeline. It will, of course, seek its lowest level and, accordingly, will accumulate in the low areas of the line, eventually building up a sizeable amount of liquid.

If there is a sudden increase in demand for gas, for example, during a cold snap, the velocity of the gas may increase as much as tenfold. Because of the increased velocity, the gas will re-entrain portions of this accumulated liquid and carry it along. The entrained liquid will in turn pick up more of the accumulated liquid in downstream low lying areas. More and more liquid will be entrained by the gas stream in this manner until there is an essentially solid slug of liquid moving through the pipeline. By way of example, in a 24 inch line, such a slug could amount to as much as 300 barrels of liquid passing through the line within one or two hours. Needless to say, this could be quite harmful to equipment using the gas, and in any event, gas containing such an amount of liquid could not be consumed or further processed.

Turning now to the present invention, FIGURE 1 is a perspective view of a preferred embodiment of the present invention, generally indicated at 10. This embodiment is composed of an elongated vessel 12 generally cylindrical in shape and having end plates 14 and 16. The vessel is supported by support members 18.

Located inside the vessel and near the end wall 14 is a cyclone separator 20. The cyclone is suspended within the vessel 12 by suitable support members which are not shown in the drawing but which may be of any conventional type. An inlet nozzle 22 is attached to the cyclone 20 and extends out of the separator vessel 12. A flange member 24 is connected to the free end of the nozzle 22 to provide means of attachment for connecting a pipeline to the nozzle. The nozzle 22 is connected to the cyclone separator 20 in such a manner that it extends from the cyclone in a tangential path. An inner annular member 26 is located in the cyclone 20 for directional purposes to aid in the movement of the gas as it is introduced into the cyclone. As can be seen in FIGURE 2, substantially all of the top portion of the cyclone is open as is the entire bottom.

Located adjacent the cyclone 20 is a slug dam 30 having a bleed hole 28 therein. The slug dam 30 extends in a direction that is transverse to the longitudinal axis of the vessel 12 and extends upwardly for a distance that is preferably two-thirds of the diameter of the vessel 12.

On the opposite side of the slug dam 30 from the cyclone 20 are anti-re-entrainment baffles 32. These baffles are horizontally disposed and extend substantially the entire distance of the vessel from the slug dam 30 to the end wall 16. Brakes 34 are provided in the baffles 32 to allow liquid to flow to the bottom of the vessel 12. The baffles may be attached to the vessel 12 by means of welding to the sidewalls as at 36 or by any other suitable means.

A liquid outlet 38 is provided near the end wall 16 to remove the liquid that is separated during the process. The outlet 38 is controlled by the liquid level controller 40 which is operatively connected to valve 42 and to liquid level responsive means 44. The liquid level responsive means utilized in the present embodiment is a float 44 extending into the vessel.

Also located at the end of the vessel 12 adjacent the end plate 16 is the mist extracting apparatus. This apparatus is generally composed of layers of mesh-like material 46 which are suspended about mid-way in the tank by end plates 48 and 50. Added rigidity is given to the mesh-like material 46 by the transverse support members 52 and longitudinal support members 54. The support members 52 are generally attached to the sidewalls of the vessel 12, and the longitudinal support members 54, to the end plates 48 and 50 by any suitable means, such as welding. The end plates 48 and 50 are semi-circular in configuration and their radii conform to the inside radius of the vessel 12. Their curved edges are securely attached to the inner sidewalls of the vessel 12 in an airtight manner, for example by welding, whereby no gas may pass around them. Accordingly, the gas stream must flow through the mesh-like material 46.

Located within the inner compartment defined by the end walls 48 and 50, the mesh-like material 46 and the sidewalls of the vessel 12, is the gas outlet generally indicated by the numeral 55. This outlet is composed of a horizontally disposed pipe 58 extending from end plate 48 to end plate 50 and having a plurality of slots 60 throughout its length. Extending upwardly from the horizontally disposed tube 58 is an outlet duct 62 having a flange 64 for attachment onto a pipeline for further conveyance of the gas stream.

Turning now to the operation of the disclosed embodiment of the present invention, the gas stream which contains various amounts of liquid flows from the pipeline (not shown) through the nozzle 22 and into the cyclone separator 20 from a tangential path of introduction. The gas stream and the liquid contained therein flow around the inside walls of the cyclone 20, whereby the gas and liquid are subjected to centrifugal forces. The gas stream moves downwardly in the cyclone in a spiral path and eventually turns upwardly and passes through the opening in the top of the cyclone. The gas then flows from the cyclone toward the end 16 of the vessel. It is drawn up through the mesh-like material 46 of the mist extractor where final separation takes place, the gas being allowed to pass, whereas the water collects in the mesh-like material, coalesces and eventually drops onto the baffles 32. This liquid will then pass through one of the openings or breaks 34 onto the bottom of the vessel. In addition, liquid will also drop out of the gas stream as it flows from the cyclone 20 to the mist extracting apparatus. This liquid will also pass through the breaks 34 to the bottom of the vessel 12.

After the gas stream has passed through the mesh-like material 46 it is drawn through the openings 60 in the horizontally disposed pipe 58. The plurality of these slots 60 extending substantially the entire length of the mesh-like material causes the gas stream to be pulled through the entire surface area of the mesh-like material 46. A single outlet nozzle would result in the stream being pulled through the mesh-like material 46 in one centralized area which would more readily become overloaded with liquid. Such outlet apparatus would not take full advantage of the entire surface area 46 as does the horizontally disposed pipe 58 with its plurality of openings 60. Once inside the pipe 58, the gas stream then passes out of the outlet duct 62 and into a pipeline (not shown).

Returning now to the cyclone 20, any large bodies of liquid that are introduced into the cyclone are subjected to the centrifugal forces therein. Due to the fact that the liquid is heavier than the gas stream, the liquid will be forced down whereas the gas stream will tend to rise. This will bring about a separation of the two and the liquid will pass through the open bottom of the cyclone 20 while the gas moves upwardly and out the top. The baffles 32 must be low enough to provide adequate space for the gas stream to flow from the cyclone to the mesh-like material 46. Any large amount of liquid that is separated by the cyclone, if allow to flow freely within the vessel 12, would overflow the baffles and be re-entrained by the gas stream as it moves from the cyclone to a position beneath the mesh-like material 46, from which position it moves upwardly through the material 46. Such a surge of liquid is, however, prevented by the use of the slug dam 30.

Large bodies of liquid that are dumped out of the cyclone 20 are retained behind the slug dam 30. A regulated amount of this liquid is allowed to pass through the bleed hole 28 to the liquid outlet 38. No sudden surges of liquid are allowed due to the utilization of the dam 30, and the possibility of liquid overload of the mist extractor is substantially reduced.

The re-entrainment by the gas stream of liquid lying on the bottom of vessel 12 between the slug dam 30 and the end wall 16 is prevented by the use of the baffles 32. Liquid is deposited in this area by dropping out of the stream as it moves to the mist extractor, by being separated in the mist extractor and dropping to the bottom of the vessel, and by liquid moving through the bleed hole 28 of the slug dam.

To prevent the overflow of the baffles, liquid removal apparatus is provided in the form of a float 44 which monitors the level of the liquid on the bottom of the vessel 12. Upon the indication by the float 44 that the liquid has reached a predetermined level, control means 40 opens valve 42, thus allowing liquid to flow from the vessel 12.

Without the dam 30 and its regulated rate of flow, a suddent surge of liquid brought about by a large slug entering the vessel could overflow the baffles and overload the liquid removal apparatus. By use of the slug dam, the necessity for large capacity liquid removal apparatus is eliminated with the resulting savings in cost. In certain situations, however, additional liquid removal means may be utilized in the area between the slug dam 30 and the end plate 14. Such additional removal apparatus may be employed, for example, where extremely large slugs of liquid may be expected.

As can be seen, the preferred embodiment of the present invention disclosed herein achieves the objective set forth at the outset. Apparatus has been provided which is both simple in construction and operation and inexpensive to manufacture, and which provides an effective means for the separation from a gas stream of liquid which has become entrained therein. The apparatus disclosed is effective, both against liquid in mist or fine particle form, and against liquid in slug form. It, furthermore, provides novel apparatus for the separation of such large bodies or slugs of liquid, while preventing the possibility of such slugs overloading the mist extracting apparatus. Means have also been provided which prevent the reentrainment of this liquid by the gas stream once it has become separated. Effective separation has been provided as well as means to maintain the gas and liquid in their separated form and for the removal of both.

The present invention, therefore, is well adapted to carry out the objects and attain the ends and advantages mentioned as well as others inherent therein. While a presently preferred embodiment of the invention has been given for the purpose of disclosure, numerous changes in the details of construction and the combination, size, shape, and arrangement of parts and uses may be resorted to without departing from the spirit and scope of the invention as hereinafter claimed.

What is claimed is:

1. Apparatus for separating from a gas stream, liquid entrained therein, said liquid being in both slug and fine particle form, including:
   a scrubber vessel,
   inlet means for the introduction of the liquid containing gas stream into the vessel,
   slug knockout means operatively connected to the inlet means to remove the liquid slugs from the gas stream as the stream is introduced into the vessel,
   a slug dam located on the downstream side of the slug knockout means, said dam retaining liquid removed by the slug knockout means to prevent this liquid from flowing freely in said vessel, whereby it may be re-entrained by the gas stream,
   a bleed hole in the bottom of said dam, whereby the bottom of the vessel is open for liquid flow limited only by the size of said bleed hold,
   anti-re-entrainment baffles to retain the liquid removed from this stream in a defined area to prevent any of the retained liquid from being re-entrained by the stream,
   gas outlet means for the removal of the scrubbed gas stream from the vessel,
   mist extractor means for removing the liquid in fine particle form from the gas enclosing the gas outlet means, whereby the gas stream must pass through said mist extractor means before reaching the gas outlet means, and
   liquid removal means for removing the separated liquid from the bottom of the vessel when said separated liquid reaches a predetermined maximum level.

2. The invention of claim 1 wherein,
   said baffles are further defined as horizontally disposed above said predetermined maximum liquid level and extending substantially the entire length and width of the vessel on the downstream side of the slug dam, whereby the liquid flowing through the bleed hole will not contact the gas stream moving from the slug knockout means to the mist extractor, and
   said slug knockout means are defined as including a cyclone, the inlet means being tangentially connected to said cyclone for tangential introduction of the liquid entraining gas stream into the cyclone.

3. The invention of claim 2 wherein the gas outlet means is further defined as including,
   a pipe extending generally parallel to said baffles but near the top of said vessel,
   a plurality of openings located throughout the length of said pipe for removing the gas from said vessel,
   said pipe being connected to a gas outlet from the vessel,
   said mist extractor means being further defined as follows,
   an extractor housing enclosing said pipe in an airtight manner,
   an opening in the bottom of said housing for the flow of gas to said pipe, said opening being above and extending generally parallel to said baffles, and extracting means covering said opening.

4. Apparatus for separating liquid entrained in a gas stream from the gas stream, including:
   an elongated vessel,
   an inlet nozzle near the first end of the vessel for introducing the gas into the vessel,
   an outlet duct near the other end of the vessel for removing the gas stream,
   a cyclone positioned inside the vessel and near the first end thereof to receive the gas stream fed by the inlet nozzle, said inlet nozzle being tangentially connected to the cyclone, said cyclone having a substantially open top for the exit of the gas stream and a substantially open bottom for the exit of liquid slugs removed by the centrifugal force exerted on the gas stream by the cyclone,
   a transverse slug dam having a bleed hole in the bottom thereof for liquid flow along the bottom of the vessel, said dam being located adjacent the downstream side of the cyclone,
   liquid level control means, including an outlet located in the bottom of the vessel, for removing the separated liquid from the vessel upon said separated liquid reaching a predetermined level at said other end of the vessel,
   horizontally disposed anti-re-entrainment baffles located above said predetermined level and extending from the slug dam to the other end of the vessel to prevent re-entrainment of separated liquid lying on the bottom of the vessel, said baffles having breaks therein to allow passage of liquid separated from the gas after it leaves the cyclone, a mist extracting housing enclosing the outlet duct, and having, an opening therein which is above and extends generally parallel to, said baffles, for the flow of the gas to the outlet duct, and mist extracting means covering the opening.

References Cited

UNITED STATES PATENTS

| | | |
|---|---|---|
| 2,610,697 | 9/1952 | Lovelady et al. _____ 55—174 X |
| 2,783,854 | 3/1957 | Lovelady et al. _____ 55—174 |
| 2,786,543 | 3/1957 | Hayes et al. _____ 55—174 |
| 2,788,080 | 4/1957 | Guarin _____ 55—186 X |
| 2,868,315 | 1/1959 | Chapie et al. _____ 55—199 X |
| 2,870,860 | 1/1959 | Ray _____ 55—186 X |
| 2,910,136 | 10/1959 | Valliant et al. |
| 3,025,928 | 3/1962 | Heath _____ 55—183 X |
| 3,192,691 | 7/1965 | Ely _____ 55—337 X |
| 3,212,232 | 10/1965 | McMinn _____ 55—184 X |

HARRY B. THORNTON, *Primary Examiner.*

S. W. SOKOLOFF, *Assistant Examiner.*